United States Patent [19]

Leibe et al.

[11] Patent Number: 4,908,824
[45] Date of Patent: Mar. 13, 1990

[54] COMMUNICATIONS SYSTEM COMPRISING A RING-SHAPED NETWORK WHICH IS PROVIDED SO AS TO PROVIDE A COMMUNICATIONS NETWORK IN THE SUBSCRIBER LINE REGION OF A DIGITAL SWITCHING EQUIPMENT

[75] Inventors: Gerhard Leibe; Klaus Kuhlmann; Albert Weiss, all of Munich, Fed. Rep. of Germany

[73] Assignee: Siemens Aktiengesellschaft, Berlin and Munich, Fed. Rep. of Germany

[21] Appl. No.: 231,230

[22] Filed: Aug. 11, 1988

[30] Foreign Application Priority Data

Aug. 11, 1987 [DE] Fed. Rep. of Germany ....... 3726716

[51] Int. Cl.⁴ .......................... H04J 3/02; H04Q 11/04
[52] U.S. Cl. .................................. 370/85.15; 370/60; 370/85.12
[58] Field of Search ........................ 370/60, 85, 86, 88, 370/94

[56] References Cited

U.S. PATENT DOCUMENTS 4,587,651  5/1986  Nelson et al. ........................ 370/88
4,661,952  4/1987  von Sichart et al. ................. 370/94
4,768,190  8/1988  Giancarlo ............................ 370/86

OTHER PUBLICATIONS

ANSI/Standard-Prtokoll 802.5 and Siemens-Drendkshrift ISDN in the Office.

2323 Telecom Report (1985) Sonderheft, Bherlin, Deutschland Thomas and Wehrend.

Primary Examiner—Robert L. Griffin
Assistant Examiner—Wellington Chin
Attorney, Agent, or Firm—Hill, Van Santen, Steadman & Simpson

[57] ABSTRACT

A ring-shaped network (RN) which is an offering network is inserted into a subscriber line region of a switching equipment (VE). A gate (GWE) is arranged in one (AEI) of the acceptance devices of the respectively accepting n subscriber line equipment (SLM) and signalling and message transmission procedure matching is done in the gateway means. The coupling to the ring-shaped network (RN) occurs through a ring-coupling (RCB) to which a gateway apparatus (GWE) and an external acceptance device (AEE) which contains a matching device (APE) and a plurality of subscriber line equipment (SLM) are connected. The matching device (APE) provides the signalling and information transmission procedure matching. For example, ISDN subscriber equipment (SE) are connected to the subscriber line equipment (SLM) via central office lines (ASL). The communications system is operated, administered and monitored either centrally by the switching equipment (VE) via an operating terminal arranged in the switching equipment (VE) or divided into two network regions, either subscriber line region/switching center or switching eqipment network/ring-shaped network by the switching equipment (VE) and/or by the gateway apparatus (GWE).

7 Claims, 1 Drawing Sheet

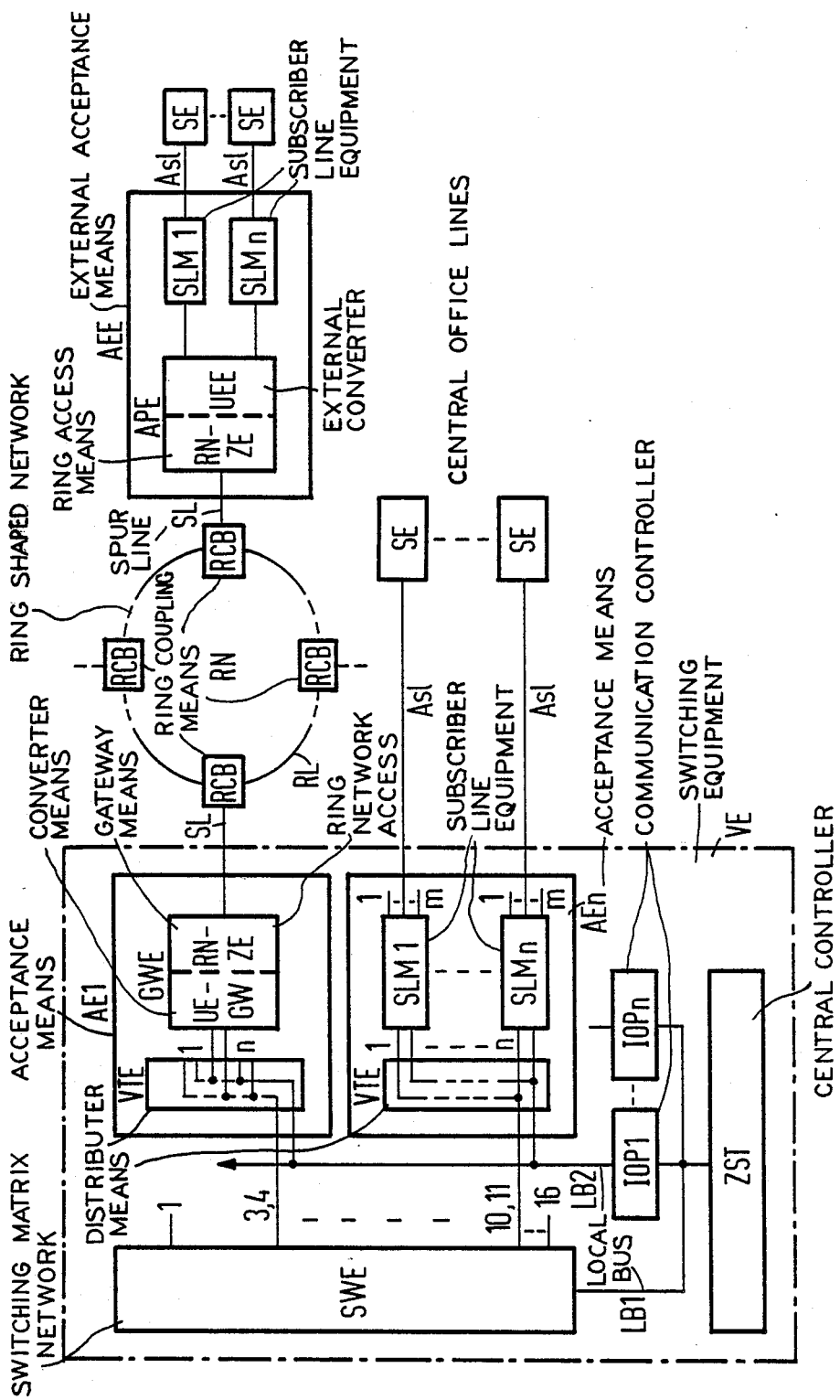

COMMUNICATIONS SYSTEM COMPRISING A RING-SHAPED NETWORK WHICH IS PROVIDED SO AS TO PROVIDE A COMMUNICATIONS NETWORK IN THE SUBSCRIBER LINE REGION OF A DIGITAL SWITCHING EQUIPMENT

BACKGROUND OF THE INVENTION

1. Field of the Invention

The invention relates to a communications system which has a ring-shaped network.

2. Description of the Related Art

Digital, computer-controlled switching equipment are predominantly utilized in private communications systems. The central control means can be a microprocessor system for small through medium switching equipments which have about 10–500 subscriber lines. The central control device usually communicates directly with a switching matrix network and, so as to relieve the central control, communicates with a plurality of subscriber line equipment by way of one or more communications sub-controllers. The subscriber equipments are connected to the subscriber line equipment which are mounted in specific acceptance means, and the connection is made via central office lines using suitable transmission procedures. In the subscriber line equipment, the signalling to the subscriber equipment as well as to the central control is accomplished using suitable hardware or, respectively, software or, respectively, procedures. For this purpose, the subscriber line equipment collects the signalling information which is received from the subscriber equipment and communicates it for further processing to the central control means after suitable editing. The communication in the opposite transmission direction occurs in a similar manner. The central control essentially executes the switching-oriented jobs, for example, identification of the switching matrix network setting on the basis of the called subscribers number. The switching equipment and the system components in the subscriber line region are operated and monitored with an operating terminal that communicates with the switching equipment and essentially with the controllers of the switching equipment by way of a specific port or a subscriber line. Such operating or, respectively, monitoring functions, for example, are modification of subscriber-associated data in the data base, the loading of the memories of the implemented processor systems with semi-permanent or, respectively, permanent data upon occurrence of down system components or for updating. The indication of faults at the operating terminal and the automatic start of fault localizing and analysis procedures can also be accomplished.

For some time, what are referred to as "local area networks" have been utilized to an increasing degree in addition to the traditional private branch exchange networks. These local networks usually represent independent communications networks; for example, a plurality of terminals which communicate with one another as well as with a central computer means. With increasing transmission rates of information, more and more ring-shaped local networks are being utilized. In contrast to bus networks, a point-to-point connection is made between the individual subscriber equipments. This means that the transmission media, for example, light waveguide transmission systems, can be utilized through which information can be transmitted with extremely high transmission rates, for example, 100Mbit/s. In order to adapt to the conditions of subscriber equipment that transmit pack-oriented and line-switching-oriented, a division of the transmission capacity of a ring-shaped network is also being used. Thus, for example, a line-switching region can be defined in which a specific sub-capacity, for example, 64Kbit/s, is allocated to a line-switching subscriber for the duration of a connection. Also, a packet region can be defined for packet-transmitting subscribers. These allocations are, respectively, stored in a memory or, respectively, a register which is provided therefore in a ring access means which executes access onto the ring-shaped network.

For the connection of additional subscriber equipment to a private switching equipment that is to be locally stationed in the region of a ring-shaped network, it is desirable to use the ring-shaped network as an offering network, whereby the private switching equipment is then to be connected to the ring-shaped network.

Reference may be made to U.S. Pat. No. 4,661,952 and to the publication by Siemens entitled "ISDN in the Office" a special issue of Telcom Report and Siemens Magazine Com. These publications are hereby incorporated by reference.

SUMMARY OF THE INVENTION

It is an object of the invention to use a ring-shaped network as an offering network for a switching equipment which uses the optimum number of software and hardware components of the existing networks and with optimally few devices and methods.

The retention of all system components of the switching equipment and of the ring-shaped network is particularly advantageous in the communications system of the invention. The subscriber line equipments are replaced in the acceptance means only by the gateway means, so that the subscriber line equipment are utilized unmodified in an external acceptance means. The ring network access means of the ring-shaped network, usually realized in one or more assemblies, can continue to be used unmodified and are accommodated in the gateway means and external acceptance means. In addition, the two conversion means and the external acceptance means are new and use new hardware and software. To what extent the operating, the maintenance and the monitoring software of the existing system components of the ring-shaped network and of the switching equipment network can continue to be employed essentially depends on the planned operating, administration and monitoring activity for the complete communications system and on the behavior of the gateway means relative to the switching equipment. The selection of which system components administer, operate and monitor is defined at the beginning of the development and is determined by factors such as development outlay costs, operating comfort, uniform monitoring philosophy, and customer demands.

The invention discloses three significant modifications of operations, administration and monitoring for the individual network components as well as two possible structural positions for the gateway means relative to the switching equipment or, respectively, of the matching means relative to the subscriber line equipment.

According to the advantageous development of the invention, all system components of the ring-shaped network and of the switching equipment network are centrally operated, administered and monitored by the switching equipment. This represents the most development-intensive software realization, but offers the greatest possible convenience for an operator of a communications system in view of operating, only one central user terminal, a man-machine interpreter (MMI), administration and knowledge regarding the complete network configuration is present, and for monitoring of central fault indication, central fault localization and analysis as well as re-commissioning.

According to a further, advantageous development of the invention, all network components of the ring-shaped network as well as the gateway matching equipment and external subscriber equipment are operated, administered and monitored in the gateway means and the switching equipments are operated, administered and monitored therein also. The software for the operation, administration and monitoring of the ring-shaped network can be transferred almost completely into the gateway means with an implementation outlay. In addition, the software for the operation, administration and monitoring of the converter means and of the subscriber line equipment accommodated in the external acceptance devices are developed and installed. In particular, these use known methods such as, for example, loading the semipermanent or, respectively permanent data into the memories of the peripheral processor systems or fault recognition, indication and localization procedures into the additional system components. Such modification contains respectively selfcontained sub-networks that are respectively operated, administered and monitored. No function overlays or, respectively, fault propagations are, thus, possible, but this can be achieved with added equipment and software.

An advantageous development of the invention is a third alternative so as to operate, administer and monitor the two communications networks. The ring-shaped network, including ring coupling and ring-network access devices, are operated, administered and monitored by the gateway means, i.e. the software that already exists and is provided for this purpose can be incorporated unaltered into the gateway means, except for a minimum implementation outlay. All system components that are also required without insertion of a ring-shaped network and, in addition, the two converter means are operated, administered and monitored from the switching equipment, and the existing software must be expanded by the requirements of the two converter means. This alternative is one that can be realized with the least additional software outlay. It is disadvantageous to operate, administer and monitor via two independent operating terminals that may have different man-machine languages (MMI). Also, given network disturbances of the respectively other monitoring equipment, the existance of a disturbance is indicated only in extremely general terms; however, no fault localization and analysis procedures are initiated or, respectively, implemented in the respectively other network. This alternative is the solution which has the lowest outlay for development, but also represents the solution which is least convenient for a network operator.

According to further, advantageous developments of the invention, the gateway means represents either a subscriber line equipment having n×m connected subscriber equipments or n subscriber line equipment each having m connected subscriber equipments which represent these at the switching side for addressing, signalling and physical interfaces. A distributor means, indirectly, the communication controller of the switching equipment is simulated in the matching equipment in both alternatives at the side of the subscriber line equipment. In an alternative form, no software modification of the addressing is required, since the gateway means behaves as though n subscriber line equipments were connected, i.e. it can be reached by the switching equipment under the same addresses that would be provided given the connection of n subscriber line equipments. A more advantageous method requires a software modification to address the switching equipment. The advantage achieved, is therein that the subscriber equipment address can be directly commuicated without having to also specifically address the corresponding subscriber line equipment.

According to a further, advantageous development of the invention, the message information are communicated in the line-switching information region and the signalling information are communicated in the packet information region of the ring information communication capacity. This division is advantageous in packet-oriented signalling information transmission, for example, for ISDN subscriber signalling, since a signalling channel must otherwise be constantly reserved in the line-switching information region. Details of this development of the invention are discussed in U.S. Pat. No. 4,661,952 which is hereby incorporated by reference.

An exemplary embodiment of the invention is described and shown in greater detail below.

BRIEF DESCRIPTION OF THE DRAWING

The FIG. is a block circuit diagram which shows the system components of a communication system.

DESCRIPTION OF THE PREFERRED EMBODIMENTS

A communications system is formed of a switching equipment VE, a ring-shaped network RN and an external acceptance means AEE. The switching equipment VE contains a switching matrix network means SWE, a central controller ZST, and at least one communications controller IOP as well as at least one acceptance means AE.

A central controller ZST, a switching matrix network means SWE and communications controllers IOP communicate by way of a first local bus system LB1. A communications controller IOP which dynamically relieves the central controller ZST is connected to a plurality n of subscriber line equipments SLM through a second local bus system LB2 and through respective distributor equipments VTE mounted in the acceptance means AE. In the distributor equipment VTE, the second local bus system LB2 is respectively connected to the n - for example, six-subscriber line equipments SLM in parallel. The distributor means VTE, for example, can be a backplane wiring of an acceptance means AE. A plurality of subscriber equipments SE, for example, eight, can be connected to each of the subscriber lines SLM with central office lines ASL. Every subscriber line equipment SLM is connected through the distributor means VTE to the switching matrix network means SWE by means of two PCM-oriented connections having a transmission rate of 2.048 mbit/s.

In the subscriber line equipment SLM, the signalling information to be communicated to or, respectively, from the subscriber equipment SE are collected, edited and communicated to the communications controller IOP or, respectively, the subscriber equipment SE by way of the second local bus system LB2 or, respectively, by way of the central office line ASL. From the communicated signalling information, for example, the call number, the central controller ZST calculates the setting information for the switching matrix means SWE which is suitable therefor and forwards this to the switching matrix network means SWE by way of the first local system LB1. The message channels, the B-channels in ISDN networks, brought to the switching matrix network means SWE by way of the subscriber line equipment SLM are connected to one another in the switching matrix network means SWE according to the selected call numbers and are connected through to the subscriber equipment SE after the central controller ZST has appropriately informed the subscriber line equipment SLM. In order to achieve a matching to the ISDN signalling procedures, packet-oriented transmission methods, for example, HDLC transmission methods, are provided for the first and second local bus systems LB1, LB2. A communications system formed in this manner is also known from a publication of Siemens, "ISDN In The Office", special issue of Telcom Report and Siemens Magazine COM. which is hereby incorporated by reference.

Instead of the subscriber line equipment SLM, a gateway means GWE is arranged in one of the acceptance means AE, for example, the AE1 which is provided with the distributor means VTE. This gateway means GWE is formed of a converter means UE-GW and of a ring-network access means RN-ZE. By way of one of the n distributor means terminals, the converter means UE-GW is connected to the communications controller IOP, for example, communications controller IOP1, and also to the switching matrix network means SWE via 2.048mbit/s inputs, for example, the inputs 3 and 4. In the converter means UE-GW, the signalling and message transmission procedures used in the switching equipment VE are matched to the initially required procedures of the ring-network access means RN-ZE. The access of a gateway means GWE to a ring-shaped network RN is controlled in the ring-network access means RN-ZE. This access, for example, occurs according to an access protocol, ANSI/IEEE Standard Protocol 802.5. The ring-network access means RN-ZE is connected to a ring coupling means RCB with a spur line SL, so that the ring-coupling means RCB can also be integrated in the gateway means GWE. The ring-coupling means RCB is inserted into the ring line RL of a ring-shaped network. By way of example, the ring line RL can be realized with optical light waveguides. The ring line RL incoming relative to the transmission direction is equipped with an optical receiver means and the outgoing ring line RL is equipped with an optical transmitter means. A plurality of such ring coupling means RCB are connected to one another via appropriately arranged ring lines RL so as to form a ring-shaped network RN.

An external acceptance means AEE is connected to one of the further ring coupling means RCB with a spur line SL. A matching means APE and a plurality of subscriber line equipment SLM connectible to the matching means APE are arranged in the external acceptance means AEE. The matching means APE is formed of a ring network access means RN-ZE and of an external converter means UEE. The ring network access controller RN-ZE in turn controls the access onto the ring-shaped network RN and the external converter means UEE matches the signalling and transmission procedures to the input conditions of the subscriber line equipment SLM. The subscriber line equipments SLM are connected to the subscriber equipment SE by way of appropriately arranged central office lines ASL. The subscriber equipment SE can be realized, for example, by ISDN subscriber equipment such as multi-functional terminals. Instead of the subscriber equipment SE, appropriate trunk lines can be connected for connecting to a public telecommunications network or to another private telecommunications network. A ring-shaped network having the properties described above is also disclosed by U.S. Pat. No. 4,661,952 which is hereby incorporated by reference.

With respect to a communications controller IOP, the converter means UE-GW in the gateway means GWE can behave either like n subscriber line equipment SLM each having m subscriber terminals or like a single subscriber line SLM having n×m subscriber equipment terminals. When the converter means UE-GW represents n subscriber line equipment SLM, which is assumed in the exemplary embodiment, then the communications controller IOP can address the gateway means GWE like the subscriber line equipment SLM, which means that no specific addressing software is required in the communications controller IOP. A specific address recognition software, however, has been developed for the converter means UE-GW. Wen the converter means UE-GW behaves like a single subscriber line equipment SLM having n×m subscriber equipment terminals, then the specific address recognition software in the converter means UE-GW is eliminated, but the software for the formation of the addresses when selecting the gateway means GWE must be blanked out in the communications controller IOP and is modified.

The operation, the administration and the monitoring of the ring-shaped network RN and of the switching equipment network can occur either centrally from the switching equipment VE, for respective inter-related network parts or independently of one another for every network. Which concept is to be used essentially depends upon the desires of the network operators and on the development costs for the respective concept. With ring-shaped networks RN inserted as offering networks in the subscriber line region of a switching equipment VE, it is desirable to operate, administer and monitor both networks independently of one another, since the inserted, ring-shaped network RN and the gateway means GWE and watching means APE for the switching equipment VE are considered as one or more series-connected line sections. Using the existing fault recognition mechanisms, thus, both networks can identify the outage of the other network and initiate and execute corresponding decommissioning or, respectively commissioning measures in its own network.

Although the invention has been described with respect to preferred embodiments, it is not to be so limited as changes and modifications can be made which are within the full intended scope of the appended claims.

We claim as our invention:

1. A communication system comprising, a digital switching equipment having a first local bus system by which a central controller means communicates with a switching matrix network means formed as a time-stage and with at least on communications controller, and which is equipped with a further local bus system by which the communications controller communicates with subscriber line equipment mounted in an acceptance means, a distributor means mounted in the acceptance means which distributes the bus system coming from the communications controller and at least one PCM-oriented message channel in-coming from terminals of the switching matrix network means to respectively n subscriber line equipment terminals in parallel, said subscriber line equipment are connectible respectively with m subscriber equipments by central office lines for analog or digital transmission capabilities where m and n are integers, a ring-shaped network mounted in the subscriber line region of the switching equipment as an offering network for transmitting information groups and having a ring line in which a plurality of ring coupling devices are mounted and to which a respective ring-shaped network access means is connected by a respective spur line, and whose ring-shaped network access means is connected to at least one ring network subscriber equipment, hardware equipment and software for operating, administering and monitoring switching equipments, office lines, subscriber equipments and the ring-shaped network, comprising a gateway means (GWE) formed of a converter means (UE-GW) and a ring-shaped network access means (RN-ZE) for coupling the switching equiment to the ring-shaped network (RN) mounted in an acceptance means (AE); said gateway means (GWE) connected to the switching equipment (VE) by said converter means (UE-GW); said gateway means (GWE) connected to the ring-coupling means (RCB) by the ring-shaped network access means (RN-ZE) which matches the signalling and message information to line network transmission procedures; at least one further ring-shaped coupling means (RCB) mounted in said ring-shaped network (RN), an external acceptance means (AEE) in which is mounted a network access means (RN-ZE) and an external converter means (UE, SLM) and to which a maximum of n subscriber equipments (SLM) are connected to said at least one further ring-shaped coupling means with a spur line (SL); external subscriber equipment (SE) connected to said subscriber equipment (SE) of the switching equipment network and connected to the subscriber line equipment (SLM) by central office lines; and said the ring-shaped network (RN) and said switching equipment network are operated, administered and monitored by said switching equipment (VE) and/or by said gateway means (GWE).

2. A communications system according to claim 1, characterized in that all system components of said ring-shaped network (RN) and said switching equipment network are centrally operated, administered and monitored by said switching equipment.

3. Communications system according to claim 1, characterized in that, in said gateway means (GWE), all network components of said ring-shaped network (RN) and said gateway means (GWE), said matching means (APE) and said external subscriber line equipment (SLM) and said switching equipment (VE) are operated, administered and monitored.

4. A commuications system according to claim 1, characterized in that said ring shaped coupling means (RCB) and said ring network access means (RN-ZE) in said gateway means (GWE) and said converter means (UE-GW, UE-SLM) and the external subscriber line equipment (SLM) and the system components of the switching equipment network are operated, administered and monitored by the switching equipment (VE).

5. A commuications system according to claim 1 or 2 or 3 or 4, characterized in that said gateway means (GWE) is a subscriber line equipment (SLM) having n×m subscriber equipment terminals, wherein n and m are integers which at the switching equipment location has addressing signaling and physical interfaces.

6. A communications system according to claim 1 or 2 or or 3 or 4, characterized in that, at said switching equipment said gateway means (GWE) has n subscriber line equipments (SLM) each of which have m connected subscriber equipment (SE) with addressing, signalling and physical interfaces; and at the subscriber line equipment, said matching means (APE) is a distributor means (VTE) of said switching equipment (VE).

7. A communications system according to claim 1, characterized in that the information transmission capacity of said ring-shaped network (RN) is subdividable into a line-switching region and into a packet information region; and the message information to be transmitted between subscriber equipment (SE) and the switching equipment (VE) are transmitted in the line-switching information region and the signalling information are transmitted in the packet information region.

* * * * *